(12) United States Patent
Glass et al.

(10) Patent No.: US 8,266,158 B2
(45) Date of Patent: Sep. 11, 2012

(54) SYSTEMS AND METHODS FOR CALCULATING A JUST-IN-TIME REPUTATION SCORE

(75) Inventors: Bryce Glass, Columbus, OH (US); F. Randall Farmer, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 285 days.

(21) Appl. No.: 12/362,917

(22) Filed: Jan. 30, 2009

(65) Prior Publication Data

US 2010/0198836 A1  Aug. 5, 2010

(51) Int. Cl.
*G06F 7/00* (2006.01)
(52) U.S. Cl. .......................................... 707/752
(58) Field of Classification Search .......... 707/732, 707/752, 723
See application file for complete search history.

(56) References Cited

U.S. PATENT DOCUMENTS

| | | | |
|---|---|---|---|
| 2006/0200375 A1* | 9/2006 | Ohnemus et al. | 705/10 |
| 2009/0254499 A1* | 10/2009 | Deyo | 706/12 |
| 2010/0115040 A1* | 5/2010 | Sargent et al. | 709/206 |

\* cited by examiner

*Primary Examiner* — Truong Vo
(74) *Attorney, Agent, or Firm* — Seth H. Ostrow; Ostrow Kaufman LLP (57) ABSTRACT

The present invention is directed towards systems and methods for generating a just-in-time reputation score. The method according to one embodiment of the present invention comprises receiving a user generated content item from a user, calculating an initial reputation score and retrieving a plurality of rules. The method then analyzes the user generated content item based on the rules and determines a just-in-time reputation score based on the analysis. Finally, the method displays the just-in-time reputation score and the content item to the user.

33 Claims, 5 Drawing Sheets

SYSTEMS AND METHODS FOR CALCULATING A JUST-IN-TIME REPUTATION SCORE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to calculating a just-in-time reputation score. More specifically, embodiments of the present invention are directed towards systems, methods and computer program products for dynamically calculating a just-in-time reputation score for a given item of user-generated content based on community rules and allowing a user to modify submitted content on the fly, thereby raising the just-in-time reputation score.

BACKGROUND OF THE INVENTION

In the current state of the art, applications allowing the submission of user generated content are a valuable source of information, collaboration and entertainment. The transformation of the Internet from a static "one way street" to a global, multi-lane highway has allowed users to interact more freely and to increase the capabilities of the network. Among the features relevant to users are rankings and ratings of user submitted content, or "user-generated content". Often, users can quickly scan lists of content and determine the quality of the content by viewing a rating such as an integer value or graphical indicators (e.g., star counts).

Conversely, the advent of user-generated content communities has inherently enabled various negative behaviors that mar the functionality of such communities. Users submitting content may maliciously or unintentionally submit content that does not conform to the standards of a given community. For example, a community wishing to promote urbane postings may frown upon the use of vulgar language, all capital letters, blatantly incoherent language or grammatically incorrect language. Users may violate this rule through "spamming" (i.e., intentionally acting in an inappropriate matter for a commercial or offensive purpose) or unintentionally violating the community standards (e.g., typing an offensive message in the heat of an argument).

One solution utilized in the current state of the art is that of a "reputation score" or "initial score" in an attempt to remedy the effects of inappropriate content. This solution assigns a given user an initial ranking (e.g., a number of stars) that indicates the user has a favorable reputation among the members of the community. This ranking may be generated on the basis of a number of factors, such as the average ranking of the user's previous content. This solution, while an improvement, suffers from multiple deficiencies.

For example, as a user participates in the community, his or her reputation tends to remain static around his or her average ranking. Accordingly, because the overall ranking for a given user may change slowly over time, the reputation score associated with her or her posts may appear to be unchanging regardless of content. Because of this, the user may never fully be aware that the community frowns upon the content he or she posted. In an extreme alternative, a user may spend a considerable amount of time accumulating good reputation in a given context and subsequently expend the existing goodwill on a small number of transgressive acts.

Thus there is currently a need in the art for systems and methods of enhancing the quality of user generated content through intelligent ranking of messages prior to submission. Furthermore, there currently exists a need in the art to allow users to know the quality of their content before submitting and to allow them to rectify deficiencies.

SUMMARY OF THE INVENTION

The present invention is directed towards systems and methods for generating a just-in-time reputation score. The method of the present invention comprises receiving a user generated content item. In one embodiment, user generated content may comprise one of text, video, audio or graphic content. The method further comprises calculating an initial reputation score and retrieving a plurality of rules.

In one embodiment, rules may comprise a plurality of global rules. In an alternative embodiment, rules may comprise a plurality of community rules. In a first embodiment, community rules are explicitly defined by a community. In a second embodiment, community rules are implicitly learned from community behavior. The method further comprises analyzing said user generated content item based on said rules and determining a just-in-time reputation score based on said analysis. In one embodiment, determining a just-in-time reputation score may comprise modifying the initial reputation score. In a first embodiment, modifying the initial reputation score comprises increasing said initial reputation score if said user generated content is in accordance with said rules. In an alternative embodiment, modifying the initial reputation score comprises decreasing said initial reputation score if said user generated content is in violation of said rules.

Finally, the method displays the just-in-time reputation score and the content item to the user. In one embodiment, the method may also display a plurality of modification options based on said rule analysis. Additionally, the method may receive a modified user generated content item in response to displaying said just-in-time reputation score and said content item. In response to receiving a modified user generated content item, the method may retrieve a plurality of rules, analyze said modified user generated content item based on said rules, determine a just-in-time reputation score based on said analysis and display said just-in-time reputation score and said modified content item to the user.

The system of the present invention comprises a plurality of client devices operative to transmit user generated content items across a network. The system further comprises a data storage module operative to store a plurality of rules. In one embodiment, rules may comprise a plurality of global rules. In an alternative embodiment, rules may comprise a plurality of community rules. In a first embodiment, community rules are explicitly defined by a community. In a second embodiment, community rules are implicitly learned from community behavior.

The system further comprises a reputation storage operative to store a plurality of user reputation scores and a server coupled to a network. The server is operative to receive said user generated content. In one embodiment, the server may be operative to receive one of text, video, audio or graphic content. The server is additionally operative to analyze said user generated content item based on said rules and determine a just-in-time reputation score based on said analysis. Those of skill in the art recognize that receiving the user generated content item, performing analysis of the user generated content item and determining a just-in-time reputation score are functions that may be performed by disparate physical or logical computing devices, computing clusters servers in physically or logically distinct datacenters, etc. In one embodiment, determining a just-in-time reputation score comprises modifying the initial reputation score. In a first embodiment, modifying the initial reputation score comprises increasing said initial reputation score if said user generated content is in accordance with said rules. In a second embodiment, modifying the initial reputation score comprises decreasing said initial reputation score if said user generated content is in violation of said rules.

The server is additionally operative to transmit the just-in-time reputation score the said content item to said client device, wherein the client device is operative to display the just-in-time reputation score and the content item. In alternative embodiments, the server is further operative to generate a plurality of modification options for display on a client device, the options based on the rule analysis. In another embodiment, the server is further operative to receive modified user generated content item from the client device in response to displaying said just-in-time reputation score and said content item. In response to receiving a modified user generated content item, the method may retrieve a plurality of rules, analyze said modified user generated content item based on said rules, determine a just-in-time reputation score based on said analysis and display said just-in-time reputation score and said modified content item to the user

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
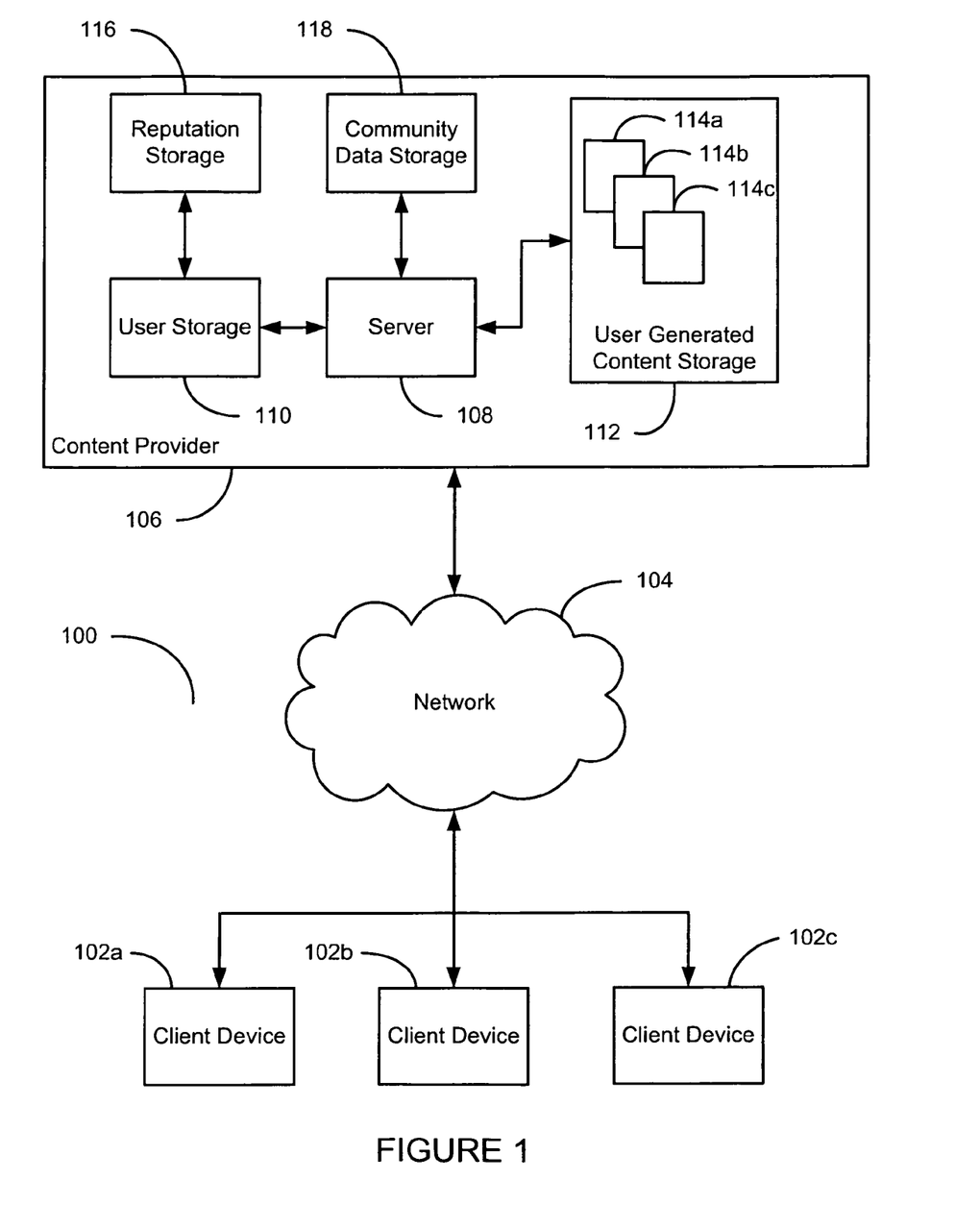
FIG. 1 presents a block diagram depicting a system for receiving user generated content and generating a just-in-time reputation score according to one embodiment of the present invention.

FIG. 1 presents a block diagram depicting a system for receiving user generated content and generating a just-in-time reputation score according to one embodiment of the present invention. According to the embodiment that FIG. 1 illustrates, a plurality of client devices 102a, 102b, 102c are connected to a network 104. Network 104 is further coupled to a content provider 106 comprising a server 108; user storage 110; user generated content storage 112; reputation storage 116; and community data storage 118. In the illustrated embodiment, network 104 is operative to facilitate data transfers between the content provider 106 and client devices 102a, 102b, 102c.

Client devices 102a, 102b, 102c comprise general purpose computing (mobile or otherwise) devices having a central processing unit, memory unit, permanent storage, optical drive(s), universal serial bus port(s), audio/video output devices, network interfaces, etc. Client devices 102a, 102b, 102c are operative to communicate via network 104 which may comprise a local or wide area network such as the Internet. In the present embodiment, client devices 102a, 102b, 102c transmit requests to content provider 106 via the HTTP protocol, WAP protocol or similar protocol.

Content provider 106 comprises a server 108 operative to handle incoming requests and manage outgoing transmissions of data to a client device 102a, 102b and 102c. Server 108 is communicatively coupled to user generated content storage 112 and is operative to retrieve or store user generated content items 114a, 114b and 114c. User generated content storage 112 may comprise a relational database, object-oriented database, flat-file database or any other storage technology known in the art. Although illustrated as a single entity, in alternative embodiments, user generated content storage 112 may comprise a plurality of databases.

Server 108 is further coupled to user storage 110. User storage 110 may contain a plurality of data records containing information regarding registered user of the system 100. User storage 110 may comprise a relational database, object-oriented database, flat-file database or any other storage technology known in the art. For example, user storage 110 may store a username, password and e-mail address associated with a given user. Additionally, user storage 110 may store additional information relevant to a user profile. In one embodiment, server 108 is operative to authenticate users by comparing authentication credentials supplied by a client device 102a, 102b, 102c with credentials stored within user storage 110.

User storage 110 may also be connected to reputation storage 116. Although illustrated as separate entities, user storage 110 and reputation storage 116 may be combined to form a single storage entity. As illustrated, reputation storage 116 may comprise reputation data associated with a plurality of users stored within user storage 110. Reputation data may comprise a numerical score associated with a user based on community rankings of the user's content. For example, a reputation for a given user may comprise the average number of stars a user receives for a given content item, such as a message board posting. For example, a "star score" of one to five may be aggregated and averaged to determine the user's reputation score. That is, if a user has received two scores of one (1) and five (5), his reputation score may be three (3). In alternative embodiments, a plurality of data metrics or algorithms may be used to calculate a user's reputation. For example, the system 100 may factor in variables such as "flag as spam" data, user rankings, number of posts, login frequency, time since registered with the system and any other factors relevant in determining the reputation score of the user.

Server 108 may also be communicatively coupled to community data storage 118. In the illustrated embodiment, community data storage 118 comprises a plurality of data records associated with a given community. Community data storage 118 may comprise a relational database, object-oriented database, flat-file database or any other storage technology known in the art. For example, a community may comprise a plurality of users associated with a given message board. As another example, a community may comprise a social network of users utilizing a web-based service such as a photo-sharing site. Community data storage 118 may be operative to store metadata and data associated with a given community. For example, community data storage 118 may store relationships of users with one another within the community as well as an index of content items (e.g., messages, photos, video, etc.) posted by the community users and associated with the given community.

Community data storage 118 may also contain a plurality of community rules. In one embodiment, a community rule comprises a constraint placed on user generated content based upon community defined standards. For example, a community may determine that user generated message board posts must be properly punctuated and should not be in all capital letters. As illustrated, community rules may reflect the views of the community users (e.g., etiquette rules).

Although illustrated as explicit rules defined by a community, the rules stored within community data storage 118 may comprise a plurality of other rules, formed by alternative means. In one embodiment, community data storage 118 may store machine-learned rules that are formulated automatically based upon the historical trend in user generated content. For example, content provider 106 may analyze a plurality of user generated content items 114a, 114b, 114c (e.g., message board posts) and may determine that a majority of highly rated messages are properly punctuated and contain few, if any, misspellings. The content provider 106 may then determine that a rule governing punctuation and spelling should apply for a given community.

In another embodiment, community rules may be based upon rules required by the content provider 106. Such rules may be considered "global rules" as they may be applied to a plurality of disparate communities. Alternatively, a content provider 106 may apply a global rule to only a subset of communities deemed to require the given rule. For example, a content provider 106 may generate a global rule indicating that obscene or inappropriate content be rejected upon submission. Alternatively, content provider 106 may determine a plurality of communities have been recently attacked by "spam" accounts and may therefore apply more stringent rules to those communities indicating that only well-formed content is to be accepted.

Server 108 may be operative to receive incoming content from a plurality of client devices 102a, 102b, 102c. Although described primarily as textual content, client devices 102a, 102b and 102c may transmit any content operative to be generated by a user such as audio, video or images. Server 108 may first be operative to retrieve a reputation score for the user uploading content. This reputation score may reflect an initial, or baseline, score for the uploaded content. The server 108 may then retrieve a plurality of community rules and determine whether the initial score should be increased or decreased based upon meeting or breaking community rules, respectively.

Figure 2:
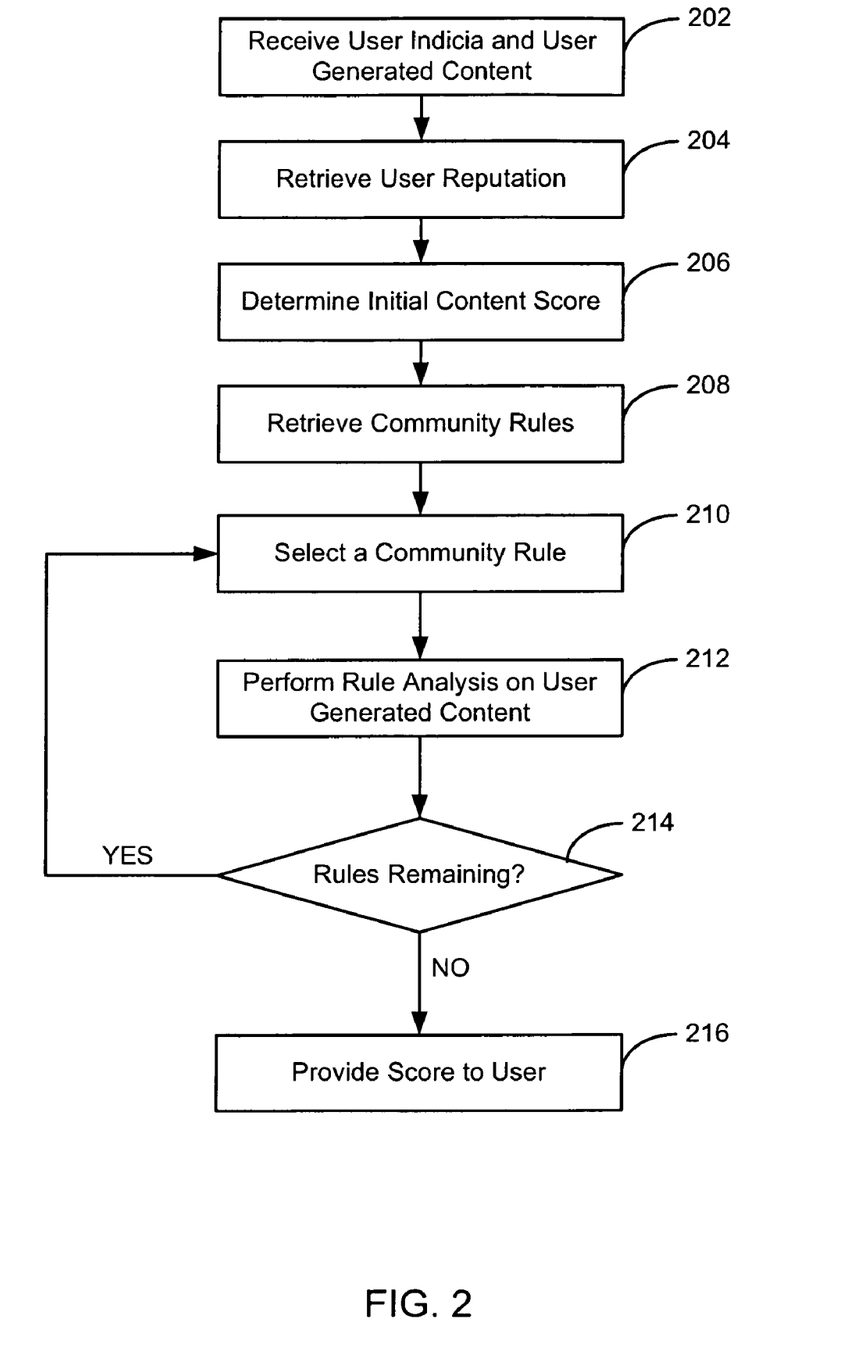
FIG. 2 presents a flow diagram illustrating a method for receiving user generated content and generating a just-in-time reputation score according to one embodiment of the present invention.

FIG. 2 presents a flow diagram illustrating a method for receiving user generated content and generating a just-in-time reputation score according to one embodiment of the present invention. As illustrated, the method 200 receives user indicia and user generated content, step 202. In the illustrated embodiment, user indicia may comprise a username or user ID associated with a user uploading the generated content. User generated content may comprise textual, graphical, audio or video content uploaded to a server by a given user.

The method 200 retrieves a user's reputation, step 204. In one embodiment, retrieving a user's reputation may comprise retrieving a numerical score indicating the average quality of a user's previously uploaded content. For example, a reputation for a given user may comprise the average number of stars a user receives for a given content item, such as a message board posting. The method 200 then determines an initial content score, step 206. In one embodiment, determining an initial content score may comprise assigning the user's reputation score as the initial content score. In alternative embodiments, determining an initial content score may comprise computing an average or weighted average of a plurality of factors such as "flag as spam" data, user rankings, number of posts, login frequency, time since registered with the system and any other factors relevant in determining the quality of the user.

After determining an initial content score, the method 200 retrieves a plurality of community rules, step 208. In one embodiment, retrieving a plurality of community rules comprises querying a community data store comprising a plurality of rules. In one embodiment, community rules may be formulated automatically based upon the historical trend in user generated content. For example, a content provider may analyze a plurality of user generated content items (e.g., message board posts) and may determine that a majority of highly rated messages are properly punctuated and contain few, if any, misspellings. The content provider may then determine that a rule governing punctuation and spelling should apply for a given community.

In another embodiment, community rules may be based upon rules required by a content provider. Such rules may be considered "global rules" as they may be applied to a plurality of disparate communities. Alternatively, a content provider 106 may apply a single rule to only a subset of communities deemed to require the given rule. For example, the method may generate a global rule indicating that obscene or inappropriate content be rejected upon submission. Alternatively, the method may determine a plurality of communities have been recently attacked by "spam" accounts and may therefore apply more stringent rules to the plurality of communities indicating that only well-formed content should be accepted.

The method 200 then selects a given community rule, step 210, and performs rule analyses on the user generated content, step 212. In one embodiment, performing rule analyses on the user generated content may comprise verifying that the user generated content conforms to the constraints dictated by a given rule. For example, a given rule may indicate that a piece of user generated text should not contain text written entirely, or above a pre-determined threshold, in capital letters. Text-processing functions known in the art may be utilized to determine the ratio of capital to non-capital letters. This ratio may then be compared to a ratio located within the rule and the initial content score may be updated to reflect the messages conformance with or deviation from the rule. One embodiment of a method for performing a community rule based analysis on a piece of user generated content is discussed more fully with respect to FIG. 3.

After performing rule based analyses on the user generated content, the method 200 determines if more rules remain within the community rules, step 214. If there are rules remaining, the method 200 performs steps 210 and 212 for the remaining rules. If no rules remain, the method 200 provides the content score to the user, step 216. One embodiment of a method for providing a content score to a user is described more fully with respect to FIG. 4.

Figure 3:
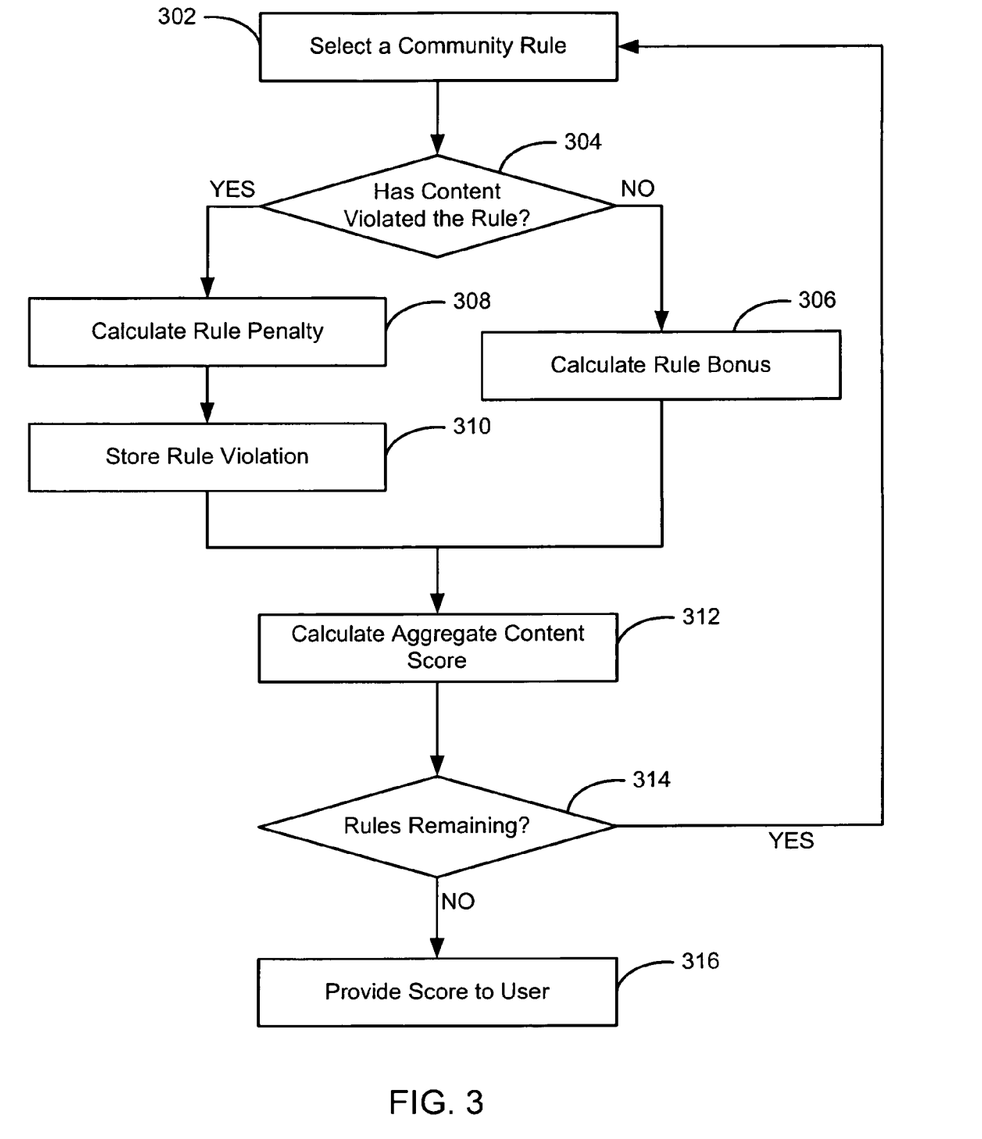
FIG. 3 presents a flow diagram illustrating a method for performing a community based rule analysis on user generated content according to one embodiment of the present invention.

FIG. 3 presents a flow diagram illustrating a method for performing a community based rule analysis on user generated content according to one embodiment of the present invention. As illustrated, the method 300 selects a community rule, step 302. Embodiments of a method for selecting a community rule has previously been discussed with respect to FIG. 3 and will thus not be discussed for clarity's sake.

The method 300 then determines whether a piece of user generated content has violated the selected rule, step 304. As previously discussed, determining whether a piece of user generated content has violated a rule may comprise performing a plurality of analyses on a given piece of content and comparing the results of the analyses with a predetermined threshold result. Examples of analyses may include, but are not limited to, text-based analyses, image-based analyses or audio/video-based analyses.

If the method 300 determines the user generated content has violated the selected rule, the method calculates a rule penalty, step 308, and stores the rule violation, step 310. In one embodiment, calculating a rule penalty may comprise executing various algorithms such as pure subtraction from the reputation score, calculating a weighted average or calculating a variable decrease in the reputation score proportional to a ratio indicating the severity of the rule violation. After calculating the rule penalty, the method 300 then stores the rule violation. In one embodiment, storing a rule violation comprises storing the identity of the rule that was violated. For example, the method 300 may store the ID of a given rule the user generated content violated. This ID may be associated with the given user generated content and stored in a local storage device for later retrieval.

If the method 300 determines the user generated content has not violated the selected rule, the method 300 calculates a rule bonus, step 306. In one embodiment, calculating a rule bonus may comprise increasing the initial reputation score of the user generated content by a fixed amount. In alternative embodiments, calculating a rule bonus may comprise various other algorithms such as pure addition to the reputation score, calculating a weighted average or calculating a variable increase in the reputation score proportional to a ratio indicating the percentage of conformity of the user generated content to the rule. In alternative embodiments, the method 300 may not calculate a rule bonus if the user generated content conforms to the rule. In this embodiment, the method 300 may simply select a next rule, if present.

After calculating a rule penalty or bonus, the method 300 calculates a just-in-time reputation score, step 312. In the illustrated embodiment, the method 300 may utilize a predetermined algorithm to calculate the effects of a plurality of rule penalties or bonuses. In one embodiment, the method 300 may simply subtract or add rule penalties or bonuses, respectively, from the initial reputation score. In an alternative embodiment, the method 300 may average the penalties and bonuses based on predetermined ranking criteria. For example, the method 300 may utilize a community's weighting of various rules to determine how the penalties or bonuses should affect the initial reputation score.

After calculating a just-in-time reputation score, the method 300 determines if any community rules exist to be analyzed, step 314. If one or more rules remain, the method 300 performs the method of steps 302, 304, 306, 308, 310 and 312 for the remaining rules. If not, the method 300 provides the just-in-time reputation score to the user, step 316. One embodiment of a method for providing a just-in-time reputation score to a user is described more fully with respect to FIG. 4.

Figure 4:
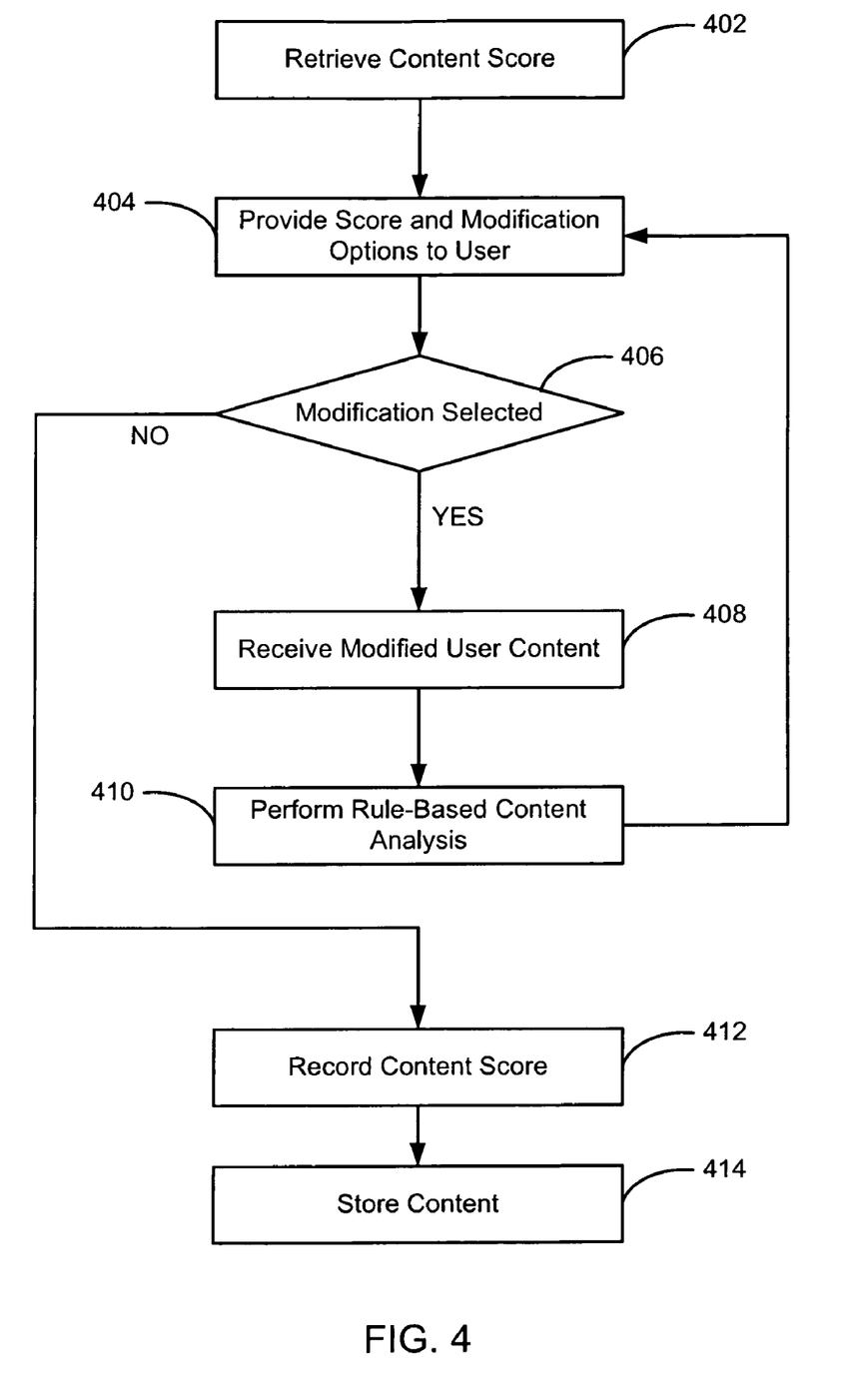
FIG. 4 presents a flow diagram illustrating a method for presenting user content and a reputation score to a user according to one embodiment of the present invention.

FIG. 4 presents a flow diagram illustrating a method for presenting user content and a just-in-time reputation score to a user according to one embodiment of the present invention. As illustrated, the method 400 retrieves a just-in-time reputation score, step 402. In the illustrated embodiment, the retrieved just-in-time reputation score may comprise the aggregate content score generated in FIG. 3. In one embodiment, the just-in-time reputation score may be retrieved immediately after calculation. For example, a just-in-time reputation score may be calculated immediately after a given user submits a piece of user generated content and the method 400 may retrieve the just-in-time reputation score immediate after generation but prior to transmitting the content score, as will be discussed further herein.

The method 400 then provides the just-in-time reputation score and modification options to a user, step 404. In one embodiment, providing a just-in-time reputation score and modification options to a user may comprise transmitting a graphical user interface ("GUI") to a user through an application, such as a web browser. Providing modification options may comprise display a list of rules that the user generated content has violated. In an alternative embodiment, providing modification options may additionally comprise displaying a list of rules the user generated content does not violate. In one embodiment, providing modification options may further comprise displaying a list of recommendations instructing the user on how the submitted content may be modified to comply with the community rules. Additionally, the method 400 may provide a plurality of links allowing automatic correction of the content upon selection of the links.

The method 400 then determines whether a user has selected one of the aforementioned modification options, step 406. If the user selects a given modification option, the method 400 receives the modified user generated content, step 408. As previously discussed, modified user generated content comprises a modification of the original user generated content based upon the user's knowledge that the content violates a community rule. For example, modification options may alert a user that a given community frowns upon messages in all capitals letters and thus may modify the content accordingly and re-submit the modified content. As previously discussed, modification of content may be performed manually by the user or may be performed automatically in response to a user selection of the modification option.

After receiving the modified content, the method 400 performs rule based analyses on the modified content, step 410. In the illustrated embodiment, performing rule based analyses on the modified user generated content comprises performing the method embodied in FIGS. 2 and 3 on the modified user generated content. Accordingly, the method 400 allows a user to modify the original content to increase the just-in-time reputation score computed by methods 200 and 300. In this manner, the method 400 allows a user to update the original user generated content prior to final submission, consequently bringing the user generated content up to the community standards exemplified in the community rules. After performing the rule-based analyses, the method 400 again provides the just-in-time reputation score and modification options, step 404. In this manner, the method 400 may provide the user with multiple rounds of rule-based suggestions to increase the just-in-time reputation score of the content prior to submission.

Alternatively, the user may not wish to modify his or her content, or the content may not have violated any of the community rules. In this alternative, the method 400 simply records the just-in-time reputation score computed previously, step 412, and stores the content, step 414. In the illustrated embodiment, recording a just-in-time reputation score and storing the content may comprise storing a single record in a database containing the user content and the just-in-time reputation score. In an alternative embodiment, just-in-time reputation scores and user content may be stored in separate storage modules. These modules may therein be connected via a key common to both storage modules.

Figure 5:
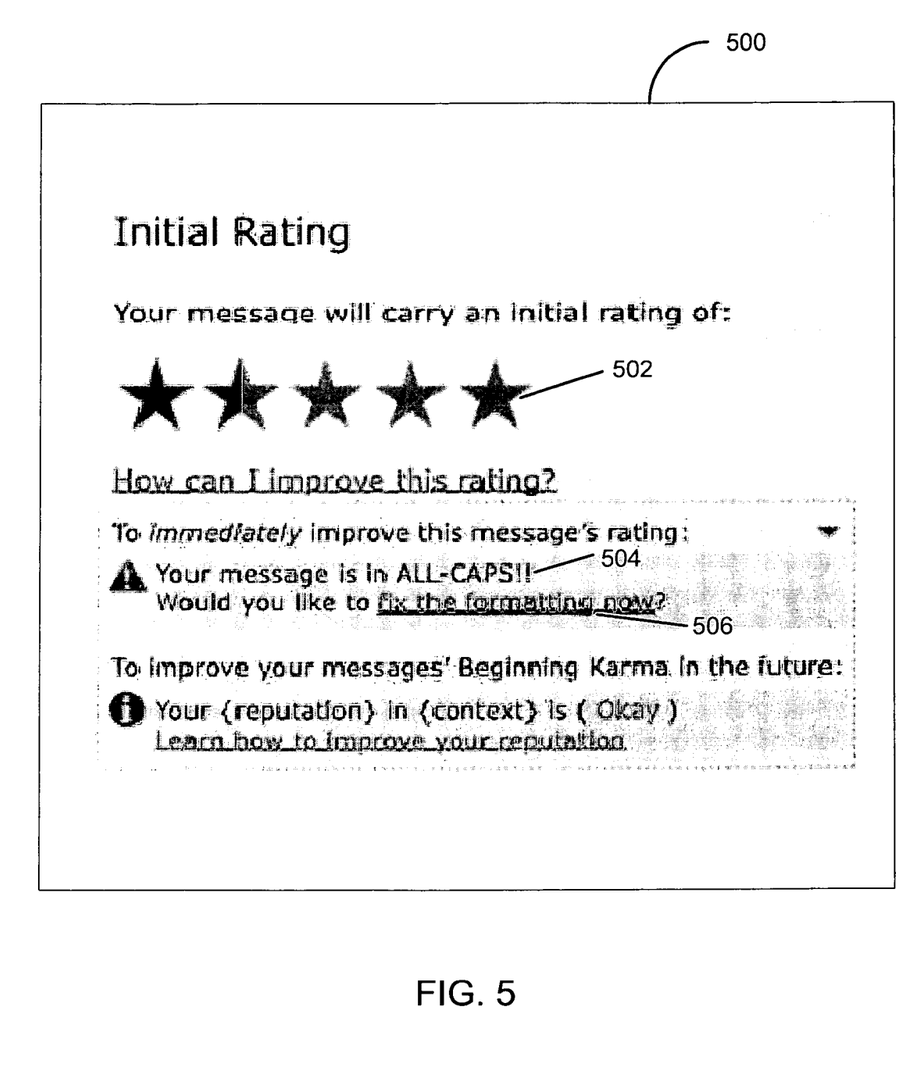
FIG. 5 presents a screenshot illustrating one embodiment of a user interface for displaying a just-in-time reputation score.

FIG. 5 presents a screenshot illustrating one embodiment of a user interface for displaying a just-in-time reputation score. As the embodiment of FIG. 5 illustrates, a GUI 500 may be presented to a user in response to the submission of user generated content. The GUI 500 may comprise a plurality of components including, but not limited to, a just-in-time reputation score indicator 502, a rule indicator 504 and a modification option 506.

As the embodiment of FIG. 5 illustrates, the user generated content has received an initial rating of one and a half stars. In one embodiment, this initial rating may comprise a combination of the user's reputation and the penalties incurred from violating a set of community rules or the bonuses gained from following a set of community rules.

As illustrated, the GUI 500 alerts the user as to which rule(s) have been violated via a rule indicator 504. In the illustrated embodiment, the user generated content has been written in all capital letters and has violated a community rule. Therefore, the GUI 500 alerts the user as to this violation.

Additionally, the GUI 500 provides a hyperlink 506 allowing the user to modify the original content to conform to the community rules. As previously described, this modification link may allow a user to manually modify the content, or may automatically modify the content.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for generating a just-in-time reputation score, the method comprising:

receiving a user generated content item from a user;

calculating an initial content score for the user generated content item, wherein the initial content score is an average of a score for each of a plurality of prior user generated content items received from the user;

retrieving one or more content submission rules based on at least one of: historical trends in a plurality of prior generated content items received from a plurality of members of a community or rules defined by the community;

analyzing said user generated content item against said one or more content submission rules;

determining a just-in-time reputation score of the user generated content item based on the initial content score adjusted accordingly to said analysis;

displaying said just-in-time reputation score, said user generated content item to the user, and a message informing the user that said user generated content item violates the one or more rules; and receiving a modified user generated content item modified in response to displaying said just-in-time reputation score, said user generated content item, and the message informing the user that said user generated content item violates the one or more rules.

2. The method of claim 1 further comprising displaying a plurality of modification options.

3. The method of claim 2, wherein the modification options comprise the one or more rules that the user has violated.

4. The method of claim 2, wherein the modification options comprise a list of recommendations outlining how the user generated content item can be modified to comply with the one or more rules.

5. The method of claim 2, wherein the modification options comprise a plurality of links allowing correction of the user generated content item upon selection of the link.

6. The method of claim 1 further comprising applying the one or more rules to the modified user generated content item.

7. The method of claim 1 wherein said rules comprise a plurality of global rules, thresholds, or weightings.

8. The method of claim 1 wherein the just-in-time reputation score is calculated by adding one or more rule bonuses or subtracting one or more rule penalties based on a community's weighting of the one or more rules.

9. The method of claim 1 further comprising storing an ID associated with the one or more rules upon determining that the one or more rules are violated.

10. The method of claim 1 wherein determining a just-in-time reputation score comprises increasing said initial content score if said user generated content item is in accordance with said rules.

11. The method of claim 1 wherein determining a just-in-time reputation score comprises decreasing said initial content score if said user generated content item is in violation of said rules.

12. A system comprising at least one processing device coupled to at least one client device over a network, the at least processing device operable at least to:
   receive a user generated content item from a user;
   calculate an initial content score for the user generated content item, wherein the initial content score is an average of a score for each of a plurality of prior user generated content items received from the user;
   retrieve one or more content submission rules based on at least one of: historical trends in a plurality of prior generated content items received from a plurality of members of a community or rules defined by the community;
   analyze said user generated content item based on said one or more content submission rules;
   determine a just-in-time reputation score of the user generated content item based on the initial content score adjusted accordingly to said analysis;
   display said just-in-time reputation score, said user generated content item to the user, and a message informing the user that said user generated content item violates the one or more rules; and
   receiving a modified user generated content item modified in response to displaying said just-in-time reputation score, said user generated content item, and the message informing the user that said user generated content item violates the one or more rules.

13. The system of claim 12 wherein the least one processing device is further operative to generate a plurality of modification options.

14. The system of claim 13, wherein the modification options comprise the one or more rules that the user has violated.

15. The system of claim 13, wherein the modification options comprise a list of recommendations outlining how the user generated content item can be modified to comply with the one or more rules.

16. The system of claim 13, wherein the modification options comprise a plurality of links allowing correction of the user generated content item upon selection of the link.

17. The system of claim 13 further comprising applying the one or more rules to the modified user generated content item.

18. The system of claim 12 wherein said rules comprise a plurality of global rules, thresholds, or weightings.

19. The system of claim 12 wherein said just-in-time reputation score is calculated by adding one or more rule bonuses or subtracting one or more rule penalties based on a community's weighting of the one or more rules.

20. The system of claim 12 further comprising storing an ID associated with the one or more rules upon determining that the one or more rules are violated.

21. The system of claim 12 wherein determining a just-in-time reputation score comprises increasing said initial content score if said user generated content item is in accordance with said rules.

22. The system of claim 12 wherein determining a just-in-time reputation score comprises decreasing said initial content score if said user generated content item is in violation of said rules.

23. A non-transitory computer readable media having computer readable program code embodied therein, the computer readable program code when executed by a processing device causes the processing device to perform a method comprising:
   receiving a user generated content item from a user;
   calculating an initial content score for the user generated content item, wherein the initial content score is an average of a score for each of a plurality of prior user generated content items received from the user;
   retrieving one or more content submission rules based on at least one of: historical trends in a plurality of prior generated content items received from a plurality of members of a community or rules defined by the community;
   analyzing said user generated content item based on said one or more content submission rules;
   determining a just-in-time reputation score of the user generated content item based on the initial content score adjusted accordingly to said analysis;
   displaying said just-in-time reputation score, said user generated content item to the user, and a message informing the user that said user generated content item violates the one or more rules; and
   receiving a modified user generated content item modified in response to displaying said just-in-time reputation score, said user generated content item, and the message informing the user that said user generated content item violates the one or more rules.

24. The computer readable media of claim 23 further comprising displaying a plurality of modification options based on said rule analysis.

25. The computer readable media of claim 24, wherein the modification options comprise the one or more rules that the user has violated.

26. The computer readable media of claim 24, wherein the modification options comprise a list of recommendations outlining how the user generated content item can be modified to comply with the one or more rules.

27. The computer readable media of claim 24, wherein the modification options comprise a plurality of links allowing correction of the user generated content item upon selection of the link.

28. The computer readable media of claim 23 further comprising applying the one or more rules to the modified user generated content item.

29. The computer readable media of claim 23 wherein retrieving said rules further comprises retrieving a plurality of global rules, thresholds, or weightings.

30. The computer readable media of claim 23 wherein the just-in-time reputation score is calculated by adding one or more rule bonuses or subtracting one or more rule penalties based on a community's weighting of the one or more rules.

31. The computer readable media of claim 23 further comprising storing an ID associated with the one or more rules upon determining that the one or more rules are violated.

32. The computer readable media of claim 23 wherein determining a just-in-time reputation score comprises increasing said initial content score if said user generated content is in accordance with said rules.

33. The computer readable media of claim 23 wherein determining a just-in-time reputation score comprises decreasing said initial content score if said user generated content is in violation of said rules.

* * * * *